May 8, 1945.  J. KARMAZIN  2,375,661
MANUFACTURE OF TUBING
Filed Feb. 11, 1942
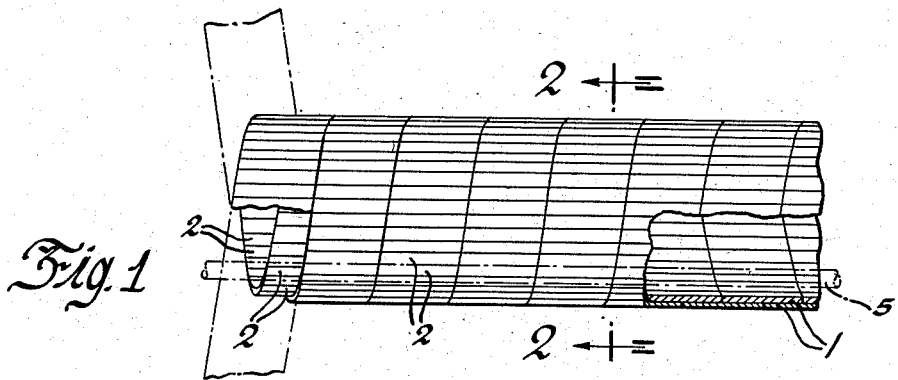
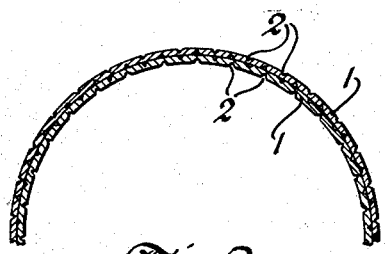
Fig. 2
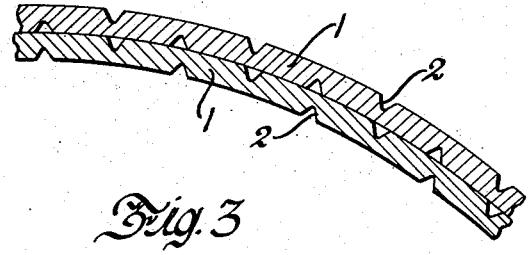
Fig. 3
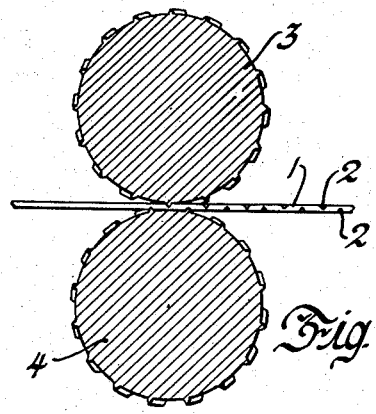
Fig. 5
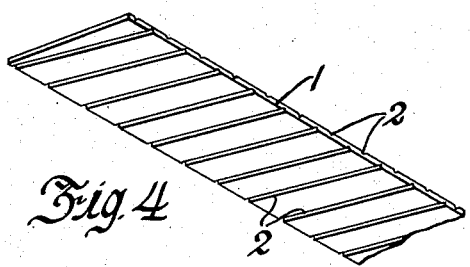
Fig. 4
Inventor
John Karmazin
By Blackmore, Spencer & Flint
Attorneys Patented May 8, 1945

2,375,661

UNITED STATES PATENT OFFICE 2,375,661

MANUFACTURE OF TUBING

John Karmazin, Grosse Ile, Mich.

Application February 11, 1942, Serial No. 430,355

2 Claims. (Cl. 29—188)

This invention relates to the manufacture of improved multiple ply thin walled tubing.

In the specific form of the invention to be described in detail the tube consists essentially of two narrow thin metal strips helically wound tightly one upon the other with the edges of succeeding convolutions of each strip in abutment and overlapped by the cooperating strip and with the contacting faces of the two strips bonded and sealed by solder. By preference the solder is applied by placing a ribbon or wire of solder inside the tube structure and applying heat to melt the solder for its entrance at the abutting strip edges and its free flow by capillarity between the tightly contacting surfaces presented between the wound strips. Unless such surfaces are entirely clean and free from stain, grease, smudge, oxidation, film or the like, an ineffectual bond is obtained and objectionable puddling occurs. For a fast bond and a strong leakproof structure it is essential that the molten solder reaches and covers when set substantially the entire face to face area of the strips. No matter how tightly parts are fitted together capillary flow will occur provided the surfaces are clean but otherwise the flow is impeded and an incomplete bond anywhere throughout the length of the strips renders the whole tube defective. Preparatory to the soldering operation the tubing is immersed for a short time in a cleaning liquid or flux to attack and wash off dirt and condition the surfaces for promoting capillarity. Since the strips are fitted tightly the amount of cleaning liquid able to reach and dispel foreign matter embedded in and clamped by the surfaces is not abundant and unless an ample amount of cleaning liquid reaches the surface the dirt is not loosened and carried off but constitutes a continuing menace to a wholly satisfactory product.

It is an object of the present invention to form a tube structure characterized by a more nearly complete and continuous bonding of the strips effected by capillary flow over thoroughly clean surfaces. To this end surface formations are provided in the face to face areas of the strips to assist and insure adequate introduction of cleaning liquid between the folds and from edge to edge of the succeeding convolutions in order to dispose of the usual impediments to capillarity. Such formations may be in the nature of and afford in effect a multiplicity of fine ducts or shallow scratches and conveniently may be made by passing the strip stock between a pair of scoring rolls to deform or cut into the surface a longitudinal succession of fine lines extending transversely of the strip. For a better explanation reference will be made to the accompanying drawing wherein Figure 1 is an elevation with parts broken away of a piece of tubing embodying the invention; Figure 2 is an enlarged transverse section taken on line 2—2 of Figure 1; Figure 3 is a still larger view showing a tube fragment in transverse section; Figure 4 is a perspective view of the scored strip stock and Figure 5 schematically represents the action of a pair of ribbed rolls to form indentations in the strip stock.

The tubing, whether of the two ply variety illustrated or of more than two plies, consists of separate strips or ribbons 1 tightly wound and wrapped helically one upon another with the edges of succeeding convolutions of each strip in abutment. As seen in Figure 1 each strip overlaps the abutting edges of its neighbor so that the edges of the neighboring strips are axially spaced apart. Each strip may be of indeterminate length to be coiled in a suitable winding machine as endless tubing and cut off to wanted lengths without scrap and waste. Preferably the several ribbon plies are coiled at the same time one about the other. Any convenient width of strip may be used within the limits of applicable laws of capillary action. Thickness of the strip can be dependent on the intended use of the tubing and the wall thickness desired. In general the tubing contemplated is light weight and thin walled and, therefore, ideal for installation on aircraft. For example, for honeycomb type radiators formed of a bundle of tubes, each tube of approximately one-fourth inch diameter, the strips employed can be from about .002 inch to .004 inch thick. Thin walls are feasible also for large diameter tubing and in any event the ribbon stock employed may be of any suitable metal, such as copper, to be bonded with ordinary lead tin solder or steel to be bonded with the usual copper brazing solder.

Prior to coiling the ribbon stock surface is indented or scratched on lines spaced longitudinally of the strip as seen at 2. For best results each line should extend all the way across the strip from edge to edge and if placed diagonally as indicated and at the proper angle such score lines or scratches after the winding operation will run axially of the tube. In depth the lines of scoring will be minute, the proportions shown in the drawing being somewhat exaggerated for better illustration. For convenience and to eliminate care in handling the score can be placed on both sides of each strip and this may be accomplished by passing the strip between a pair of scoring rolls 3 and 4 each having a series of circularly spaced diagonal peripheral ridges to be pressed into the ribbon surface as the rolls rotate and carry the stock forward.

Optionally the scoring may be done only on the side of the strip to be brought face to face with the companion strip and a scored strip, whether having one or both sides scored, may be employed with a companion strip devoid of scoring on either side. So long as at least one of the contacting faces of the tube plies contains a multiplicity of scratches the cleaning operation will be facilitated upon immersion of the tubing in the usual cleaning bath. The liquid enters all along the helical lines occurring in the plies between the abutting edges of the succeeding strip convolutions and flows axially between the contacting surfaces with the scratches providing a plurality of minute ducts for promoting free flow and speeding up the time necessary to cover the entire surface area to attack and wash off impurities. A short time element is of utmost importance for practical commercial production.

The thorough cleansing of the surface properly conditions the tubing for the bonding operation in which molten solder is applied for capillary flow between the abutting edges of the convolutions and throughout the area of the face to face contact. If a piece of solder in the form of a wire 5 is inserted inside the tube and heat applied by placing in an oven the solder will become fluid and flow into and around the tube plies. By proper control a solder coating may be obtained additionally on the exposed tube surfaces as a protective skin. The amount of solder required can be calculated beforehand and with proper solder flow, i. e., unimpeded flow as insured by cleansed surfaces and the absence of interference to capillarity throughout the contacting ribbon areas, all of the predetermined amount of solder does useful work and there is no excess or piling up of solder in the form of puddles inside the tube but instead a clean smooth interior will be had.

Light weight thin walled and sturdy tubing is thus made which can be put to any of a variety of uses. The bond will be strong enough to withstand strain and to enable the tube to be further formed as, for example, tube cut into given length and expanded at opposite ends into hexagonal or other shape as ordinarily done with extruded or seamless single ply tubing in making up the conventional type of tube bundle honeycomb radiator. Tubing formed of helically wound strip having the direction of grain running substantially circumferentially of the tube is even better adapted for expansion of the ends than is the conventional type of tubing having its grain running axially. This is for the reason that the expansion is not across the grain but rather is more nearly in the direction in which the grain extends and, consequently, the stretching stress is less likely to rupture the metal or produce incipient fracture.

For use in a fin and tube radiator, wherein heat transfer fins are carried on the outside of the tubes, the fins and tubes may be fitted together and bonded in the same operation in which the tube plies are united. In such event, the provision of score lines on the exterior tube surface will assist in insuring clean contact faces between the tightly fitted tubes and fins and the production of secure bonds.

I claim:

1. The method of forming multi-ply tubing comprising passing ribbon stock between a pair of pressure rollers, at least one of which has tiny ridge formations thereon which form minute shallow scratches extending across the ribbon surface in intersecting relation with the longitudinal edges thereof, coiling said ribbon helically with its scratched surface in tight face to face contact with another helically coiled ribbon and with successive convolutions of both ribbons in edge to edge abutment and the edges of one ribbon offset to the edges of the other, then immersing the coils in a cleaning liquid bath for flow assisted by said scratches, of cleaning liquid between the inner and outer ribbons and thereafter inserting a solder strip within the interior tubular space of the innermost coil and placing the assembly in a brazing oven for the application of heat to melt the solder and cause its capillary flow through the fissures between the convolution edges and thence between the inner surface of the outer ribbon and the outer surface of the inner ribbon.

2. In the manufacture of thin walled multi-ply tubing, the method of insuring capillary flow of solder between tight contact intimate faces of ply laminations, including preforming minute edge intersecting scratches in the surface skin of thin ribbon stock, coiling said ribbon to cylindrical shape and tightly fitting the same as one ply to a companion ply, with its minutely scratched skin in intimate surface contact with the surface of the companion ply, immersing the fitted plies in a cleaning liquid for flow between the intimate surfaces to condition the same for subsequent solder flow, and then flowing molten solder first radially of the tube between adjoining edges of ribbon convolutions and thereafter axially of the tube between said intimately contacting surfaces.

JOHN KARMAZIN.